Feb. 17, 1959 G. O. CHAPMAN 2,874,250
THERMOSTATIC SWITCH
Filed Feb. 28, 1958
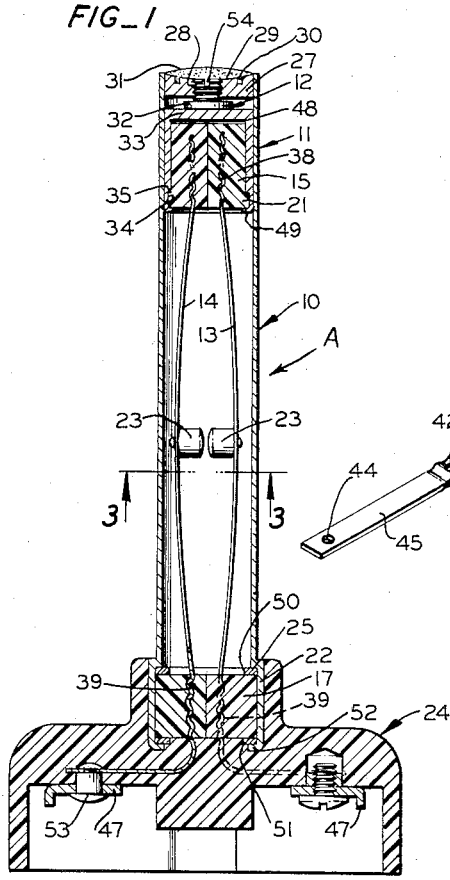
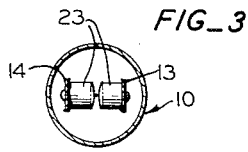
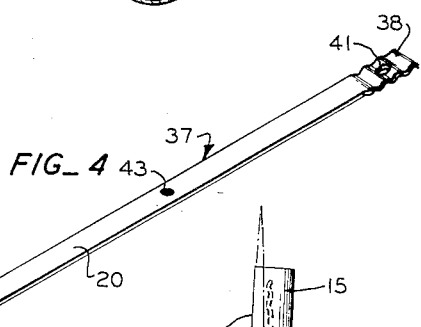
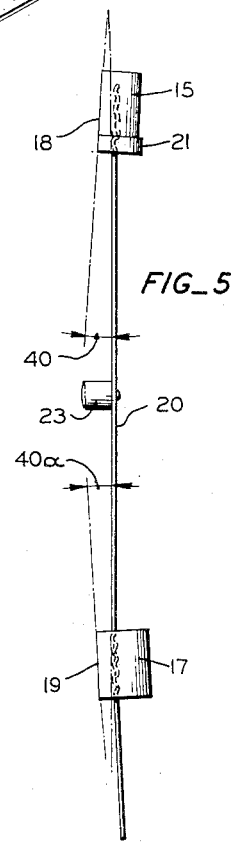
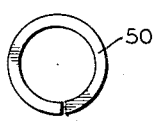
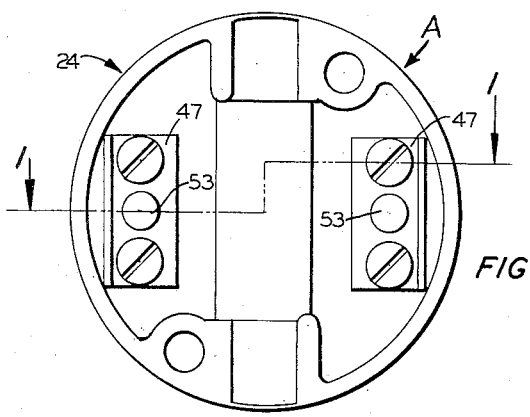
INVENTOR.
GALEN O. CHAPMAN
BY Hansen and Lane
ATTORNEYS

United States Patent Office 2,874,250
Patented Feb. 17, 1959

2,874,250

THERMOSTATIC SWITCH

Galen O. Chapman, Irvington, Calif.

Application February 28, 1958, Serial No. 718,161

13 Claims. (Cl. 200—137)

The present invention relates to switches, and pertains more particularly to thermostatic switches for use in fire detection and similar circuits.

In the past, thermostatic switches have been developed wherein a pair of bowed struts, having opposed, inwardly facing contacts thereon, are mounted within a thermally expansible enclosure or shell. In such prior devices, it has been common practice to make the shell of a material having a high rate of thermal expansion and the struts of a material having a relatively low rate of thermal expansion.

The present invention contemplates the provision of a thermostatic switch comprising a shell having a known rate of thermal expansion, a thermally expansible strut-holding element mounted within the shell and acting oppositely to the shell upon thermal expansion thereof, and a pair of bowed, thermally expansible struts mounted within the shell and also acting oppositely to the shell upon expansion thereof. The rate and amount of thermal expansion of these three switch elements controls the time lag in the operation of the switch under different rates and amounts of temperature rise.

The invention also provides a thermostatic switch wherein the struts are subjected to definite bowing stresses after assembly by providing each strut with a mounting element having a mating face thereon, said face being disposed at a fixed angle relative to a contact carrying portion of the strut.

A further object of the invention is to provide an improved thermostatic switch.

A still further object of the invention is to provide an improved mounting arrangement for a pair of bowed struts in a thermostatic switch.

These, and other objects and advantages of the invention, will be apparent from the following description and the accompanying drawing, wherein:

Fig. 1 is a longitudinal sectional view taken along line 1—1 of Fig. 2.

Fig 2 is a bottom view of the switch shown in Fig. 1.

Fig. 3 is a transverse sectional view taken along line 3—3 of Fig. 1.

Fig. 4 is a perspective view of the body portion of one of the strut members illustrated in the switch shown in Figs. 1 and 3, prior to the angular offsetting of its ends.

Fig. 5 is a side elevational view of one of the completed struts shown in Fig. 1.

Fig. 6 is a plan view of a split washer used in mounting the base strut inserts in the shell as shown in Fig. 1.

Briefly, the invention comprises a thermostatic switch A, having a tubular shell 10 of a material having a desired rate of thermal expansion. For the purpose of the present description, the switch will be described in the position it occupies in Fig. 1, although it may be mounted in any position without adversely affecting its operation. A cup-shaped sheath 11 is fitted slidably within the upper end of the shell 10, and its upward movement therein is limited by an adjusting screw 12, threadedly mounted in the upper end of the shell 10. The side wall of the sheath 11 is substantially thicker than that of the shell 10 so as to have a high thermal capacity for its length. The sheath 11 is relatively short compared to the shell 10, and to a pair of struts 13 and 14. The struts 13 and 14 are mounted in the shell 10 in oppositely bowed relation, and each strut has an upper insert 15 and a lower insert 17 moulded thereon. The inserts 15 and 17 are formed with flat, mating faces 18 and 19 thereon, said flat faces being disposed at known angles to the normally straight intermediate strut portion 20 between the inserts.

Each upper strut insert 15 is provided with a positioning rim 21 thereon, and the two upper inserts 15 are fitted, in complementary relation, and with their flat faces 18 together, into the sheath 11.

The lower inserts 17 are similarly fitted, in complementary relation and with their flat faces 19 together, into an enlarged lower portion 22 of the shell 10. This mounting arrangement induces a specific outwardly bowing stress effect on the intermediate, normally straight portions 20 of the struts when the latter are mounted as shown in Fig. 1.

Each strut is provided with an inwardly extending contact member 23, which may be of silver, located preferably medially of the strut portion 20, and of a height to contact each other when the two struts 13 and 14 are free from longitudinal compression effect by the screw 12. The lower end portion of the shell 10 may be moulded into a conventional plastic or other suitable insulative base structure 24.

In will be understood that the thermal characteristics, i. e., expansion rate, conductivity and capacity, of the material selected for each of the three sensing elements of the switch, namely, the shell 10, the sheath 11, and the struts 13 and 14, as well as the sizes of these members, will be determined by the operating characteristics required. In the present specification the invention will be described as being embodied in the switch A and constructed of materials which have been employed in a switch capable of passing the National Board of Underwriters' requirements for a fire alarm switch of a predetermined type.

Referring to the drawings in detail, the tubular shell 10 is of an aluminum alloy known as 6061–T–6, and preferably is heavily anodized externally to resist oxidation and corrosion. The lower portion 22 of the shell 10 is of larger diameter than the remainder thereof to provide a seating shoulder 25 therein. A closure head 27, with a threaded axial hole 28 therein, is provided in the upper end of the shell 10. The upper face 29 of the head 27 is concave, and preferably is provided with a concentric, annular groove 30 therein for improved sealing contact with a seal 31 which is applied, in plastic condition, to the head 27 after the switch has been finally adjusted in a manner to be described later herein.

The adjusting screw 12 is screwed upwardly into the threaded hole 28 in the shell head 27, and preferably has a Class 3 fit therein. The screw head 32 is flat, smooth, and perpendicular to the axis of the screw 12 to permit fine adjustment of the switch after its completion.

The cup-shaped sheath 11 is of a material having a known rate of thermal expansion, for example, 70–30 commercial brass, with its upper surface smooth, flat and perpendicular to the axis of the sheath 11 throughout the area which is contacted by the head 32 of the adjusting screw. The sheath has a close, but slidable fit within the shell 10, and the head 33 of the sheath is sufficiently thick to prevent deflection by the screw head 32 during operation.

An annular rabbet 34 is provided within the lower end of the sheath 11 to provide a seating shoulder 35 for the rim 20 around the lower ends of the upper inserts 15.

The two struts 13 and 14 preferably are identical to each other, and are mounted in relatively reversed position as shown in Figs. 1 and 3. Each strut comprises a body portion 37 consisting of a strip of springy, electrically conductive material having a desired rate of thermal expansion such as, for example, Phosphor bronze, Grade A, with a 5% tin content, spring temper, stretcher leveled.

Each strut strip 37 is provided with two corrugated areas 38 and 39 which are to be enclosed by the plastic inserts 15 and 17, respectively. These corrugated portions 38 and 39 are bent at a selected angle, such as, for example, the angle 40 in Fig. 5, to the straight intermediate portion 20. The corrugated portions 38 and 39 are pierced by holes 41 and 42, respectively, to allow the plastic material of the inserts to flow therethrough, and thereby more firmly to anchor the inserts to the struts.

A hole 43 also is provided medially of each normally straight strut portion 20 and the contact member 23, which preferably is of non-corrosive, electrically conductive metal, such as fine silver, is riveted in position in this hole 43 to extend toward the flow faces 18 and 19 of the inserts 15 and 17, respectively. A hole 44 also is provided on a straight, terminal portion 45 of each strut which extends below the lower corrugated strip portion 39 for the riveting of a terminal strip 47 to the strut.

The inserts 15 and 17 are moulded of suitable electrically non-conductive material, such as a suitable plastic material, to enclose and firmly grip the corrugated strut portions 38 and 39, respectively, of each strut strip 37. The inserts 15 and 17 are of semi-circular cross-sectional configuration with flat, diametrically extending faces 18 and 19, respectively.

Each upper insert 15 is provided with a rim portion 21 of enlarged diameter around the curved peripheral portion of its lower end to fit snugly within the rabbeted groove 34 in the lower end of the cup-shaped sheath 11. The upper inserts 15 are of a size that when two thereof are fitted together with their flat faces 18 together, they will fit into the sheath 11 as shown in Fig. 1 with the rim 21 seated against the shoulder 35, and with a slight clearance at 48 (Fig. 1) from the head 33 of the sheath 11 so as not to interfere with axial contraction of the sheath at extremely low temperatures, for example, −40° F.

The upper inserts 15 are secured in position in the sheath 11 by rolling in the lower edge of the sheath as at 49 to grip the rim 21 between this rolled-in flange 49 and the shoulder 35. With the upper inserts 15 thus mounted with their flat faces 18 in over-all contact with each other as shown in Fig. 1, the normally straight strut portions 20 tend to diverge from the common plane of these contacting faces at the angle 40 (Fig. 5). A split washer 50, of the same external radius as the lower inserts 17, is assembled around the straight strut portions 20 after the upper inserts have been mounted in the sheath 11.

Before assembling the struts 13 and 14 and the sheath 11 within the shell 10, the adjusting screw 12 is first screwed upwardly into the hole 28. The sheath 11, with the upper inserts 15 and their embedded struts 13 and 14 mounted therein and the washer 50 assembled thereon is then inserted upwardly into the tubular shell 10. The lower inserts 17 are brought together with their flat faces 19 thereof in over-all contact with each other. Due to the angle 40 and 40a between the flat insert faces 18 and 19 and the normally straight, intermediate strut portion 20, this action tends to spring the struts toward their bowed condition shown in Fig. 1.

The split washer 50 is forced upwardly into seated condition against the shoulder 25 provided by the enlarged lower shell portion 22. It is preferred that the lower inserts 17 have a tight fit within the enlarged lower shell portion 22, and to this end the lower shell portion preferably is thermally expanded by heating prior to inserting the lower inserts therein. These inserts 17 are of a size to have a press fit within this heated lower shell portion 22 so that upon contraction of the shell as it resumes normal or room temperature, the lower inserts will be gripped tightly and in substantially hermetically sealed relation therein. A lower washer 51, which also preferably is of steel and of the same size as the upper washer 50, is then inserted into the lower end of the shell 10 against the underside of the lower inserts 17, and the lower end of the shell is then curled inwardly at 52 to firmly grip the inserts 17 between their positioning washers 50 and 51. The bowing of the struts produced by the angular offset 40 and 40a between the flat insert faces 18 and 19 and the intermediate strut portion 20 should be such that the contacts 23 will close when the struts, assembled as in Fig. 1, are in their normal condition, i. e., free from longitudinal compressive stress by the screw 12.

The lower projecting end portions 45 of the struts 13 and 14 then are bent outwardly as shown in Fig. 1, and the terminal strips 47 are secured, one to each of the struts, as by rivets 53 (Figs. 1 and 2). The base 24 then may be moulded onto the lower end of the shell 10, and is of suitable insulative material such as a plastic material.

For setting the switch A, the entire switch assembly as shown in Fig. 1 is brought to a desired uniform or saturated temperature, for example, a temperature of 160° F. This condition may be attained, for example, by immersing the switch, upside down, to a depth just short of the open bottom end of the base in a bath having the desired temperature, for a period of time long enough to insure complete heat saturation of the entire unit, for example in excess of one hour and fifteen minutes.

A conventional electrical test circuit, not shown, including, for example, a battery, suitable conductor wires, and an electric light bulb, is then connected across the two terminal strips 47 so that when the contacts 23 on the struts 13 and 14 are closed, such test light will be lighted, and when the contacts are open, such light will go out.

By means of a suitable screw driver type of device, not shown, the screw 12 then may be rotatively adjusted, relative to the shell 10, so that the contacts 23 will just "make," or, in other words, until the instant when the test circuit indicates that the contacts have just closed. This adjustment must be made very carefully since any turning of the adjusting screw beyond the instant of "make" will provide an inaccurate adjustment. The switch A then is removed from the heating device and is allowed to assume room temperature.

Since the thermal expansion rate of the shell 10 is greater than that of the sheath 11 and struts 13 and 14, and, further, since the shell 10 is exposed to the ambient atmosphere while the sheath 11 and struts 13 and 14 are not, as soon as the shell cools even slightly below the setting temperature, contraction of the shell will increase the pressure of the screw 12 on the sheath 11, and thereby will increase the bowing of the struts and cause the contacts 23 to open.

The shell head sealant 31 may be, for example, a paste made of a mixture of epoxy resin and aluminum grindings or filings, which sealant may be pressed into place by any suitable tool so as to enter the annular groove 30 and an adjusting slot 54 in the screw 12. Such a sealant is sold commercially under the trade name Devcon F. When the sealant hardens, it secures the adjusting screw 12 in adjusted condition, and also hermetically seals the joint between the screw 12 and the shell head 27.

The operation of a switch A embodying the invention and having the shell 10, sheath 11 and struts 13 and 14 constructed of the metals recited herein, is as follows:

The switch A is first set or adjusted as described previously herein to just "make" at a selected saturated temperature, for example, 160° F. Since the rate of thermal expansion of the shell 10 in the illustrative embodiment of the invention described herein is greater than that of the sheath 11 and the struts 13 and 14, at any saturated temperature below the setting temperature the contacts 23 will be open.

Assuming that the switch A is at a room or ambient temperature of 85° F., upon a rapid heating of the ambient atmosphere, for example, 40° F. per minute, which might occur in the presence of a fire, the aluminum alloy shell 10 is heated very rapidly and, due to the shortness of time, with little or no transfer of heat to either the sheath 11 or to the struts 13 and 14. This rapid heating of the shell 10 causes it to elongate by thermal expansion, and since there is no compensating or oppositely acting elongation of the sheath 11 and struts 13 and 14, such expansion of the shell moves the screw 12 upwardly and thereby removes the endwise compressive stress by the screw 12 on the struts and allows the normal spring action of the latter to close the contact points 23.

From the same initial starting temperature of 85° F., upon a more gradual rise in temperature, for example, 10° F. per minute, the shell 10 is heated, but a portion of the heat absorbed by the shell is transferred by conduction to the sheath 11. This transference of heat from the shell 10 to the sheath 11 has a dual retarding effect on the closing action of the switch in that it not only tends to reduce the temperature of the shell, but also, by thermal expansion, tends to elongate the side wall of the sheath. The shoulder 35, bearing on the enlarged lower rims 21 of the upper inserts 15 urges the latter, with their moulded-in strut ends, in a direction opposite to the longitudinal expansion of the shell. Also, upon such slow rise in temperature, a portion of the heat absorbed by the shell from the ambient atmosphere is radiated inwardly, thereby heating the struts 13 and 14, which action, by thermal expansion, tends to lengthen the struts, which further tends to counteract the contact-closing effect of shell elongation. All of this tends to lengthen the time required to close the contacts 23 and actuate the switch.

Upon a very slow heating of the switch, for example, at the rate of 1° F. per minute from an assumed normal temperature of 85° F., the sheath 11 and struts 13 and 14 are heated in the manner described above so as to maintain a temperature closely approaching that of the shell 10 and thereby prevent closure of the contacts 23 until all of the parts approach their saturated setting temperature, which, in the present instance, has been assumed to be 160° F.

It is apparent, therefore, that the slower the rise in temperature of the ambient atmosphere, and therefore of the shell 10, the longer will be the time required after initiation of the rise to close the contacts 23, and the closer will be the temperature of the ambient atmosphere to the setting temperature.

It will be obvious to one having read the present description of the invention in the light of the accompanying drawings that the dimensions of the shell 10, sheath 11 and struts 13 and 14, as well as the thermal properties of the material of which each of these parts is made will all materially affect the operation of the device. Therefore a wide range of operating characteristics may be had by specifying materials and sizes which will give the herein set forth desired operating characteristics for a required set of operating conditions. Such modifications are within the routine capabilities of one familiar with thermostatic fire alarm switches who has read the foregoing specification with reference to the accompanying drawings.

The structure and mounting arrangement disclosed herein insures a uniform bowing of the struts, and thereby uniform operation of the switch throughout a wide range of temperature. Such uniformly bowed and stressed strut structure has been impossible to obtain by assembling a pair of struts as a double, integral unit, since in such case it was impossible to tell by viewing the latter after assembly whether a certain bowed condition is caused by a plastic deformation of the strut material, or lateral outward stresses imposed by a bending of the strut material at its ends adjacent the inserts or plugs.

Due to the compensating action of the sheath 11 and the struts 13 and 14, the contacts 23 will remain close together, but open, during a gradual rise in temperature of all parts of the switch up to a predetermined or adjusted maximum, but will close rapidly upon an increase in temperature of the ambient air so sudden as to be unlikely to be caused by means other than a fire in the vicinity of the switch. Thus the switch will "ride out" gradual temperature rises until such desired maximum temperature is reached before closing so as to avoid false alarms, but will close rapidly upon a sudden rise in temperature of the shell alone.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A thermostatic switch unit comprising a thin-walled, elongated shell of a material having a high coefficient of thermal expansion, one end of said shell being closed, non-conductive mounting means mounted in the other end of said shell, a pair of oppositely bowed struts mounted lengthwise within said shell, one end of each strut being embedded in said mounting means, a pair of switch contacts on the inner sides of said struts, a cup-shaped sheath of material having a high coefficient of thermal expansion, and with substantially thicker side walls than said shell, fitted for slidable movement within the closed end of said shell and with the open end of said sheath facing said mounting means, an insulative plug mounted within said sheath and secured thereto only adjacent the open end of said sheath, the other end of each of said struts being embedded in said plug, whereby thermal expansion of the sheath moves the plug and the strut ends embedded therein axially of the shell toward said mounting means, and an adjusting screw extending from the closed end of said shell into thrust engagement with the closed bottom of said sheath and operable to urge said sheath toward said mounting means for exerting a bowing, endwise stress on said struts.

2. A thermostatic switch unit comprising a thin-walled, elongated shell of a material having a high coefficient of thermal expansion, one end of said shell being closed, a pair of medially separate, non-conductive mounting means mounted in the other end of said shell, a pair of oppositely bowed struts mounted lengthwise within said shell, one end of each strut being embedded in said mounting means on each side of the medial separation thereof, a pair of switch contacts on the inner sides of said struts, a cup-shaped sheath of material having a high coefficient of thermal expansion, and with substantially thicker side walls than said shell, fitted for slidable movement within the closed end of said shell and with the open end of said sheath facing said mounting means, an insulative plug mounted within said sheath and secured thereto only adjacent the open end of said sheath, the other end of each of said struts being embedded in said plug, whereby thermal expansion of the sheath moves the plug and the strut ends embedded therein axially of the shell toward said mounting means, and an adjusting screw extending from the closed end of said shell into thrust engagement with the closed bottom of said sheath and operable to urge said sheath toward said mounting means for exerting a bowing, endwise stress on said struts.

3. A thermostatic switch unit comprising a thin-walled, elongated shell of a material having a high coefficient of thermal expansion, one end of said shell being closed, non-conductive mounting means in the other end of said shell, a pair of oppositely bowed struts mounted lengthwise within said shell, one end of each strut being embedded in said mounting means, a pair of switch contact elements on the inner sides of said struts, a cup-shaped sheath of a material having a high coefficient of thermal expansion, and with its side wall substantially thicker than the wall of said shell, fitted slidably within the closed end of said shell and with its open end facing said mounting means, said sheath being supported against slidable endwise movement toward the closed end of the shell only at the closed bottom of the sheath, an insulative plug mounted within said sheath and secured thereto only adjacent the open end of said sheath, the remainder of said plug being slidable within said sheath, the other end of each of said struts being embedded in said plug, whereby thermal expansion of the sheath moves the plug and the strut ends embedded therein axially of the shell toward said mounting means, and means for adjusting the endwise bowing stress on said struts.

4. In a thermostatic switch having a thin-walled elongated, thermally expansible shell and having a pair of oppositely bowed struts mounted therein with contact means carried by said struts for actuation by changes in the bowed condition of the struts; a strut comprising a strip of springy material, a normally substantially straight intermediate portion in said strut, an insert of insulative material moulded onto an end of said strut intermediate portion, a face formed on said insert and adapted to fit against the corresponding face of an insert on another strut paired therewith, the insert on said strut being of a size and shape to fit in complementary, paired relation with a corresponding insert of another strut closely within such switch shell, the intermediate strut portion being normally inclined at a fixed angle from said face of the insert formed thereon, whereby, when a pair of struts is mounted in such shell with the insert of such struts fitted together in complementary, face-to-face relation and the opposite end of the intermediate strut portion is drawn toward such other strut a known distance, the intermediate strut portion will be subjected to a definite bowing stress.

5. In a thermostatic switch having a thin-walled, elongated, thermally expansible shell and having a pair of oppositely bowed struts mounted therein with contact means carried by said struts for actuation by changes in the bowed condition of the struts; a strut comprising a strip of springy material, a normally substantially straight intermediate portion in said strut, an insert of insulative material moulded onto an end of the strut intermediate portion, with the longitudinal axis of the insert disposed at a fixed angle relative to the straight strut portion, means for fixedly mounting said insert in complementary, paired relation with a corresponding insert of another strut coaxially within such switch shell, whereby, when a pair of said struts are mounted in such shell, with the inserts thereon disposed co-axially within such shell, and the opposite ends of the intermediate strut portions are drawn toward each other a known distance, the intermediate strut portions will be subjected to a definite bowing stress.

6. A strut structure for a thermostatic switch having an elongated, thermally-expansible shell and having a pair of struts mounted in oppositely bowed condition therein; said strut comprising a body portion of springy, electrically conductive metal strip material, a normally substantially straight intermediate portion therein, a pair of mounting inserts of electrically insulative material secured to said strip, one at each end of said normally straight portion, a face of each insert being disposed at a required angle lengthwise of the normally straight strut portion, the inserts on said strut being formed and adapted to fit into such shell in complementary relation with the corresponding inserts of a second similar strut, and with the angularly disposed faces of complementary inserts in positioning contact with each other, whereby the normally straight intermediate strut portion is subjected to a lateral bowing stress.

7. A strut for a thermostatic switch having an elongated, thermally-expansible shell and having a pair of struts mounted in oppositely bowed condition therein; said strut comprising a body portion of springy, electrically conductive metal strip material, a substantially straight intermediate portion therein, a corrugated portion at each end of said straight portion, a mounting insert of electrically insulative material on each corrugated portion and at a fixed angle to said straight strut portion, the inserts on said strut being formed and adapted to fit into such shell in alignment with such shell and in complementary relation with the corresponding inserts of a second similar strut, whereby the normally straight intermediate strut portion is subjected to a lateral bowing stress.

8. A strut structure for a thermostatic switch having an elongated, thermally-expansible shell and having a pair of struts mounted in oppositely bowed condition therein; said strut comprising a body portion of springy, electrically conductive metal strip material, a normally substantially straight intermediate portion therein, a pair of mounting inserts of electrically insulative material secured to said strip, one at each end of said normally straight portion, the inserts on said strut being formed and adapted to fit in fixed condition into such shell in conjunction with the corresponding inserts of a second similar strut, and with the strut straight portion adjacent each insert inclined at an angle relative to the longitudinal axis of such shell when mounted therein, whereby the normally straight intermediate strut portion of said strut is subjected to a lateral bowing stress.

9. In a thermostatic switch having a thermostatically expansible shell with a pair of struts mounted in oppositely bowed condition therein; a strut mounting arrangement wherein each strut is provided with a separate insert of insulative material secured thereto and arranged for mounting, in complementary relation with a corresponding insert on the other strut of a pair thereof, in fixed relation within such shell, a portion of the strut adjacent its insert being normally disposed at a known angle to said insert, thereby to exert a known bowing stress on each strut.

10. In a thermostatic switch having a thermostatically expansible shell with a pair of struts mounted in oppositely bowed condition therein; a strut mounting arrangement wherein each strut is provided with a separate insert of insulative material secured thereto and arranged for mounting in such shell in fixed relation with a corresponding insert on the other strut of a pair thereof, a portion of each strut adjacent its insert being normally disposed at a known angle to said insert, thereby to exert a known bowing stress on said strut.

11. A thermostatic switch comprising a thermostatically expansible shell, a pair of struts mounted in oppositely bowed condition therein, a cup-shaped sheath mounted within one end of said shell, separate inserts of insulative material secured to each strut, one of the inserts on each strut being formed and adapted to fit, in close, complementary relation with the corresponding insert of the other strut, within said sheath, the other insert on each strut being formed and adapted to fit in a similar manner within said shell, a portion of each strut adjacent each of said inserts being normally disposed at a known angle to said insert, thereby to exert a known bowing stress on said struts.

12. A thermostatic switch unit comprising a thin-walled, elongated shell of a material having a high coefficient of thermal expansion, one end of said shell being closed, electrically insulative mounting means in the other end of said shell, a pair of oppositely bowed struts mounted lengthwise within said shell, one end of each strut being embedded in said mounting means, a pair of switch contact elements on the inner sides of said struts, a sheath of a material having a high coefficient of thermal expansion, and comprising a tubular side wall substantially thicker than said shell, fitted slidably within the closed end of said shell, said sheath being supported against outward endwise movement only at the end thereof remote from said mounting means, an electrically insulative plug mounted within said sheath and secured thereto only at a substantial distance inwardly from the supported end of the sheath, the remainder of said plug being slidable relative to said sheath and said shell, the other end of each of said struts being embedded in said plug, whereby thermal expansion of the sheath moves the plug and the strut ends embedded therein axially of the shell toward said mounting means, and means for adjusting the endwise bowing stress of said struts.

13. A thermostatic switch unit comprising a thin-walled, elongated shell of a material having a high coefficient of thermal expansion, a pair of oppositely bowed struts mounted lengthwise within said shell, one end of each strut being fixedly secured within one end of the shell, a pair of switch contact elements on the inner sides of said struts, a sheath of a material having a high coefficient of thermal expansion, and comprising a tubular side wall substantially thicker than said shell, fitted slidably within the other end of said shell, said sheath being supported against endwise movement away from the fixedly secured strut ends only at the end of the sheath remote from said fixedly secured strut ends, an electrically insulative plug mounted for axial slidable movement within the shell, and in thrust engagement with the end of the sheath opposite to the supported end of the latter, the other end of each of said struts being embedded in said plug, whereby thermal expansion of the sheath moves the plug and the strut ends embedded therein axially of the shell toward said fixedly secured strut ends, and thereby tends to counteract a straightening of the struts caused by a thermal expansion of the shell.

References Cited in the file of this patent

UNITED STATES PATENTS

| | | |
|---|---|---|
| 2,185,433 | Fenn et al. | Jan. 2, 1940 |
| 2,740,018 | Griffiths et al. | Mar. 27, 1956 |
| 2,755,359 | Rike | July 17, 1956 |
| 2,829,220 | Chapman | Apr. 1, 1958 |